(12) United States Patent
Abbas et al.

(10) Patent No.: US 9,840,279 B2
(45) Date of Patent: Dec. 12, 2017

(54) REMOVABLE STEERING-WHEEL ASSEMBLY FOR AN AUTONOMOUS VEHICLE

(71) Applicant: Ford Global Technologies, LLC, Dearborn, MI (US)

(72) Inventors: Samer Abbas, Dearborn, MI (US); John P. Joyce, West Bloomfield, MI (US); Scott J. Lauffer, Northville, MI (US); Steven R. El Aile, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 2 days.

(21) Appl. No.: 15/075,722

(22) Filed: Mar. 21, 2016

(65) Prior Publication Data
US 2017/0267285 A1    Sep. 21, 2017

(51) Int. Cl.
 *B62D 15/02* (2006.01)
 *B60R 21/16* (2006.01)

(52) U.S. Cl.
 CPC ............ *B62D 15/025* (2013.01); *B60R 21/16* (2013.01); *B62D 15/021* (2013.01)

(58) Field of Classification Search
 CPC ...... B62D 15/025; B62D 15/021; B60R 21/16
 See application file for complete search history.

(56) References Cited

U.S. PATENT DOCUMENTS

| | | |
|---|---|---|
| 4,743,883 A | 5/1988 | Yoshimi et al. |
| 5,835,870 A | 11/1998 | Kagawa |
| 2002/0101067 A1* | 8/2002 | Breed ................. B60N 2/0232 280/741 |
| 2011/0060503 A1* | 3/2011 | Futahashi ............. B62D 6/008 701/41 |
| 2011/0153160 A1* | 6/2011 | Hesseling ............. B60K 35/00 701/41 |
| 2013/0002416 A1* | 1/2013 | Gazit ...................... B62D 1/28 340/438 |

(Continued)

FOREIGN PATENT DOCUMENTS

| | | |
|---|---|---|
| JP | H0747969 A | 2/1995 |
| JP | H09193691 A | 7/1997 |
| JP | 2000159136 A | 6/2000 |

(Continued)

OTHER PUBLICATIONS

UK Search Report dated Aug. 29, 2017 re Appl. GB1704228.4.

*Primary Examiner* — Calvin Cheung
(74) *Attorney, Agent, or Firm* — Frank A. MacKenzie; Bejin Bieneman PLC

(57) ABSTRACT

A steering-wheel assembly includes an actuator, an actuator controller, a steering wheel, an attachment, and a data connector (referred to hereinafter as a first data connector). The actuator controller includes a processor and a memory and is communicatively coupled to the actuator. The steering wheel is rotatably coupled to the actuator. The attachment is coupled to the actuator. The first data connector is mounted on the attachment and in communication with the actuator controller. The actuator controller is programmed to instruct the actuator to rotate the steering wheel based on steering-wheel control data provided via the first data connector.

22 Claims, 9 Drawing Sheets

(56) References Cited

U.S. PATENT DOCUMENTS

2014/0109719 A1    4/2014   Lisseman et al.
2014/0172235 A1    6/2014   Werling et al.

FOREIGN PATENT DOCUMENTS

| | | |
|---|---|---|
| JP | 2003252232 A | 9/2003 |
| JP | 2009286211 A | 12/2009 |
| JP | 2016107794 A | 6/2016 |
| KR | 20050006736 A | 1/2005 |
| KR | 1020130139475 A | 12/2013 |
| WO | WO 2016023756 A1 | 2/2016 |

* cited by examiner

US 9,840,279 B2

REMOVABLE STEERING-WHEEL ASSEMBLY FOR AN AUTONOMOUS VEHICLE

BACKGROUND

Autonomous vehicles have the ability to drive without the intervention of a human driver, that is, a vehicle computer makes decisions about accelerating, braking, and steering the vehicle. A vehicle may be fully autonomous or semi-autonomous. A semi-autonomous vehicle may be autonomous only in particular situations, for example, highway driving or parallel parking, or with respect to certain vehicle subsystems, for example, braking but not acceleration or steering.

When a vehicle is driving autonomously, a vehicle computer, sometimes referred to as a "virtual driver," may send signals directly to the engine, brakes, and steering; the signals need not pass through the controls accessible to the human driver, the pedals and steering wheel. A steering wheel that does not move while the vehicle moves, however, may disorient the human driver.

Both fully and semi-autonomous vehicles may need the ability to hand over control of the vehicle from a virtual driver to the human driver. A handover may become more difficult if a steering wheel is not moved during autonomous operation of steering, and if the human driver does not know the orientation of the front wheels of the vehicle.

DETAILED DESCRIPTION

Figure 1:
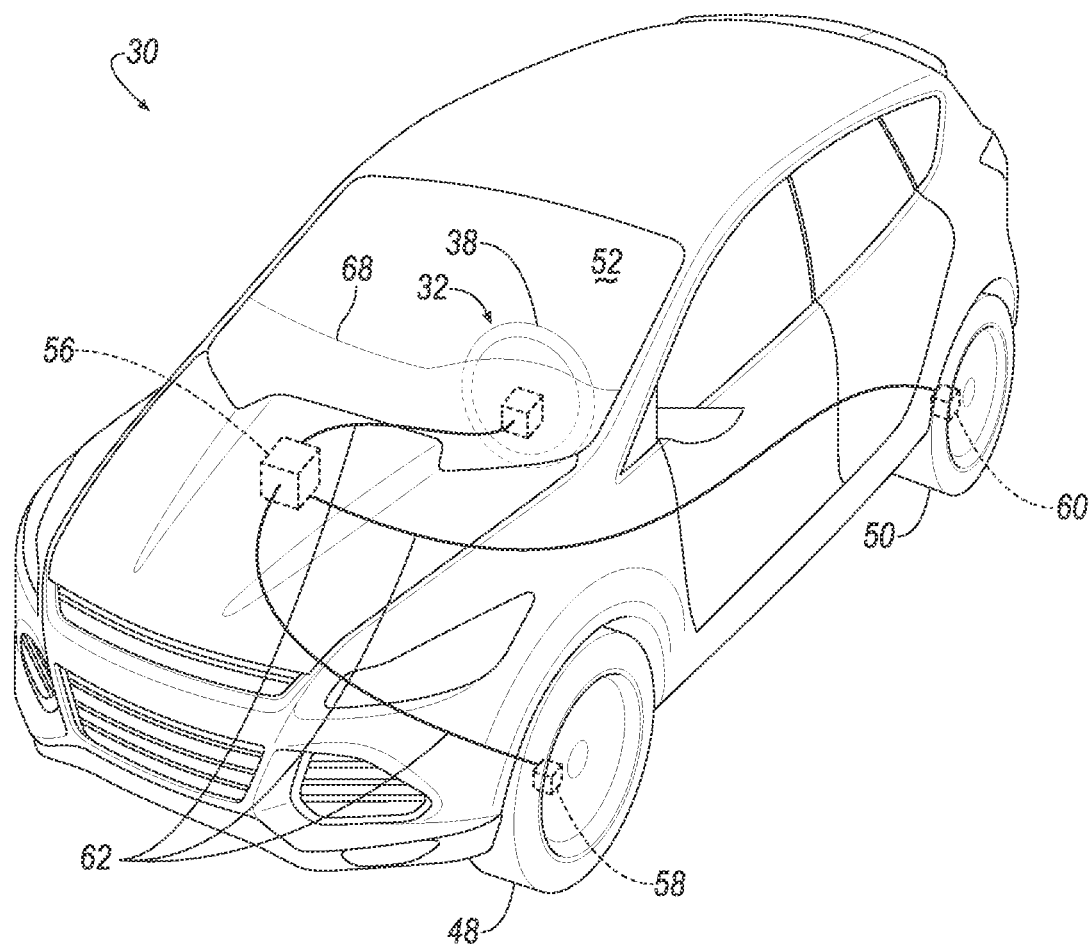
FIG. 1 is a perspective view of a vehicle including an example steering-wheel assembly.

With reference to the Figures, wherein like numerals indicate like parts throughout the several views, a steering-wheel assembly 32 includes an actuator 34, an actuator controller 36, a steering wheel 38, an attachment 40, and a data connector 42 (referred to hereinafter as a first data connector 42). The actuator controller 36 includes a processor 44 and a memory 46, and is communicatively coupled to the actuator 34. The steering wheel 38 is rotatably coupled to the actuator 34. The attachment 40 is coupled to the actuator 34. The first data connector 42 is mounted on the attachment 40 and is in communication with the actuator controller 36. The actuator controller 36 is programmed to instruct the actuator 34 to rotate the steering wheel 38 based on steering-wheel control data provided via the first data connector 42.

The steering-wheel assembly 32 may provide information about the orientation of front wheels 46 of a vehicle 30. A human driver may feel more comfortable because the behavior of the steering wheel 38 "matches" the behavior of the vehicle 30. Moreover, the human driver advantageously may more easily take over control of driving from the vehicle 30 if the human driver knows the orientation of the front wheels 46. The removability of the steering-wheel assembly 32 may advantageously provide more space in a passenger cabin 52 for occupants to use the cabin as they wish.

With reference to FIG. 1, the vehicle 30 includes at least one front wheel 46, at least one rear wheel 50, and a passenger cabin 52. The vehicle 30 may have front-wheel drive, rear-wheel drive, or all-wheel drive. The front wheels 46 may turn in order to steer the vehicle 30. The passenger cabin 52 may house occupants of the vehicle 30.

Figure 5:
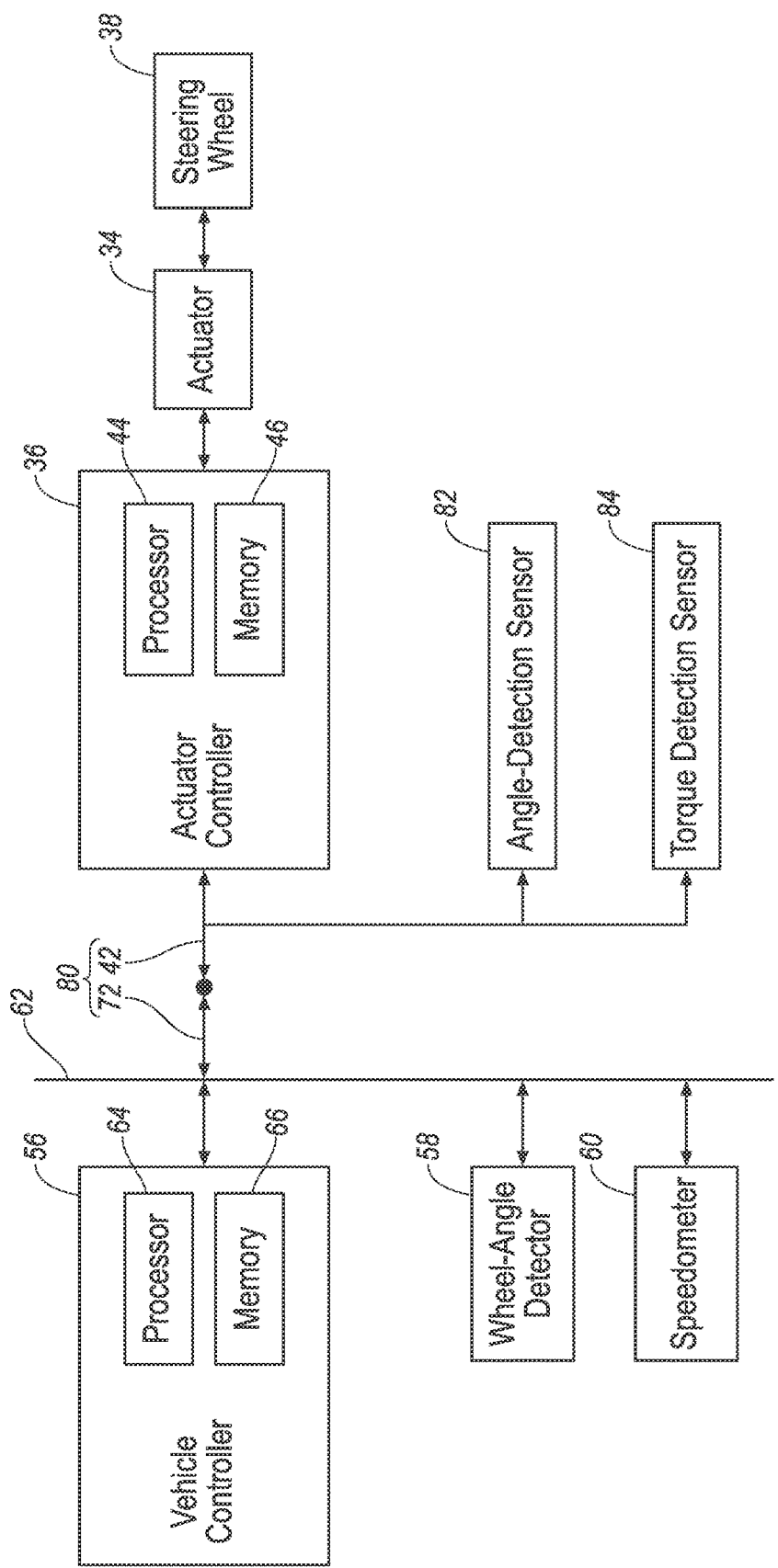
FIG. 5 is a block diagram of an example vehicle including the example steering-wheel assembly of FIG. 1.
Figure 6:
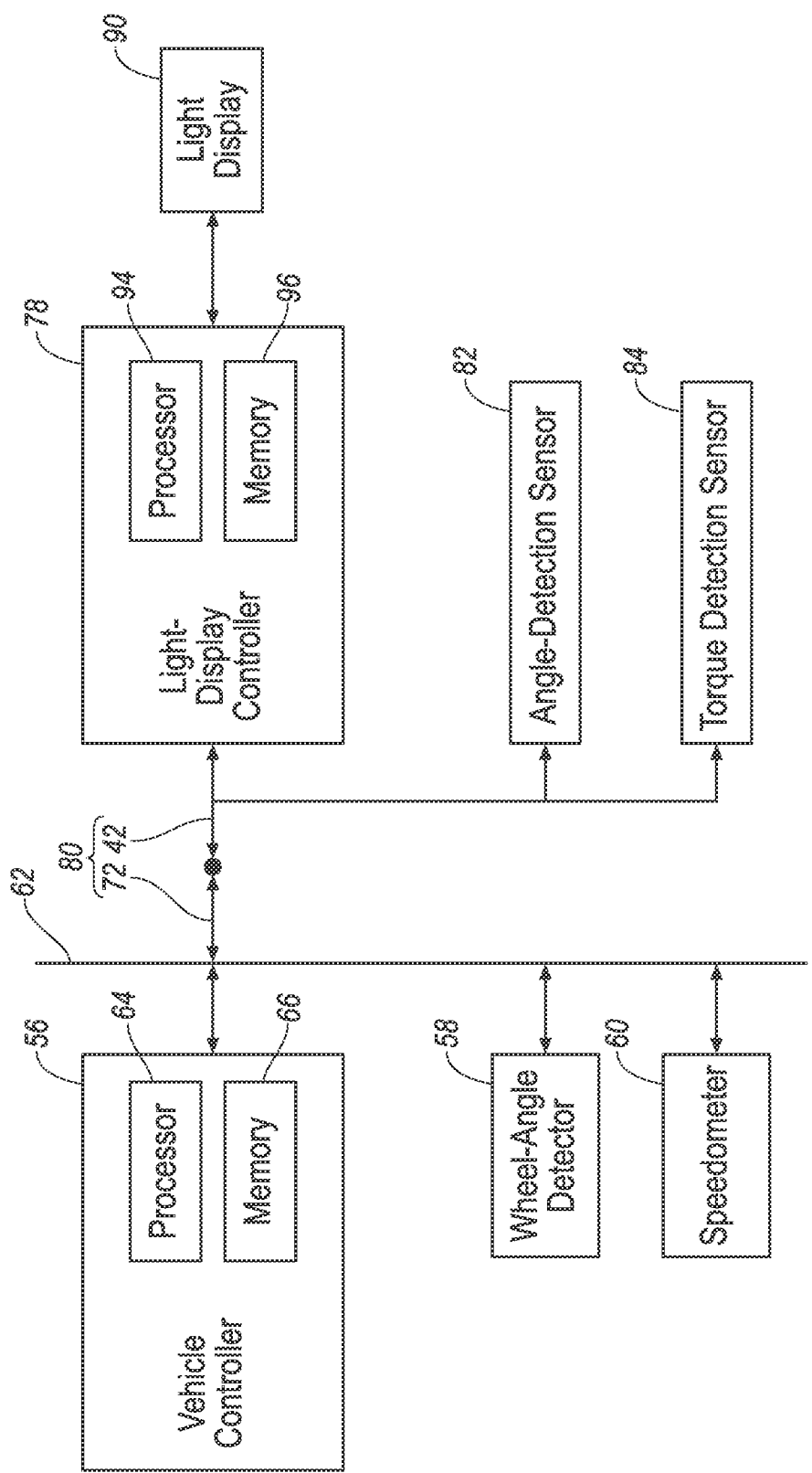
FIG. 6 is a block diagram of the vehicle and the example steering-wheel assembly of FIG. 3.

With additional reference to FIGS. 5 and 6, the vehicle 30 may include a vehicle-control system 54. The vehicle-control system 54 may include a vehicle controller 56, sensors such as a wheel-angle detector 58 and a speedometer 60, and a communication network 62. The vehicle-control system 54 may transmit signals through the communication network 62, such as a controller area network (CAN) bus, Ethernet, and/or any other wired or wireless communication network.

The vehicle 30 may be an autonomous vehicle. The vehicle controller 56, sometimes referred to as the "virtual driver," may be capable of operating the vehicle 30 independently of the intervention of a human driver, to a greater or a lesser degree. The vehicle controller 56 may be programmed to operate the engine, braking system, steering, and/or other vehicle systems.

The vehicle controller 56 may be a microprocessor-based controller. The vehicle controller 56 comprises a processor 64 and a memory 66. The memory 66 of the vehicle controller 56 may store instructions executable by the processor 64.

The vehicle controller 56 may have an autonomous mode and a manual mode. The steering, engine, and brake of the vehicle 30 may be controlled by the vehicle controller 56 when the vehicle 30 is in autonomous mode and controlled by a human driver when the vehicle 30 is in manual mode. The steering wheel 38 may be fixed relative to the attachment 40 when the vehicle controller 56 is in autonomous mode.

The wheel-angle detector 58 may be coupled to the front wheel 46 and in communication with the vehicle controller 56. The wheel-angle detector 58 may be any sensor suitable, and such as may be known, for measuring the orientation of the front wheel 46, for example, an analog wheel-angle sensor measuring a voltage difference or a digital sensor such as an optic sensor. The wheel-angle sensor may be in communication with the vehicle controller 56.

The speedometer 60 may be in communication with the vehicle controller 56. The speedometer 60 may be any sensor suitable for measuring the speed of the vehicle 30, for example, as is known, a mechanical or eddy-current speedometer, or a vehicle speed sensor. A vehicle speed sensor may use a magnetic field detector to count interruptions of a magnetic field by a toothed metal disk disposed on a driveshaft of the vehicle 30.

Figure 2:
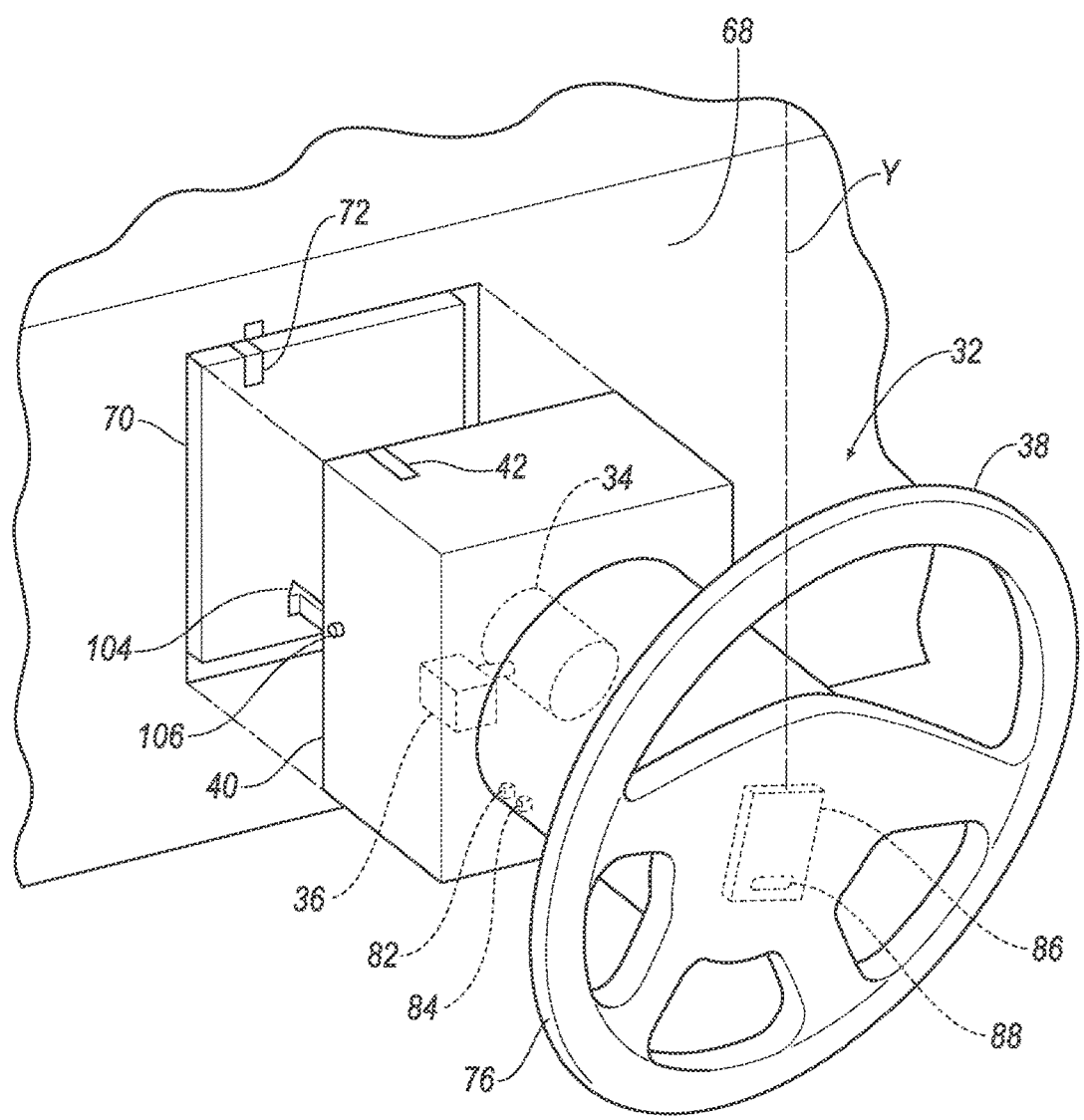
FIG. 2 is a perspective view of a dashboard and the steering-wheel assembly of FIG. 1 with an actuator.
Figure 3:
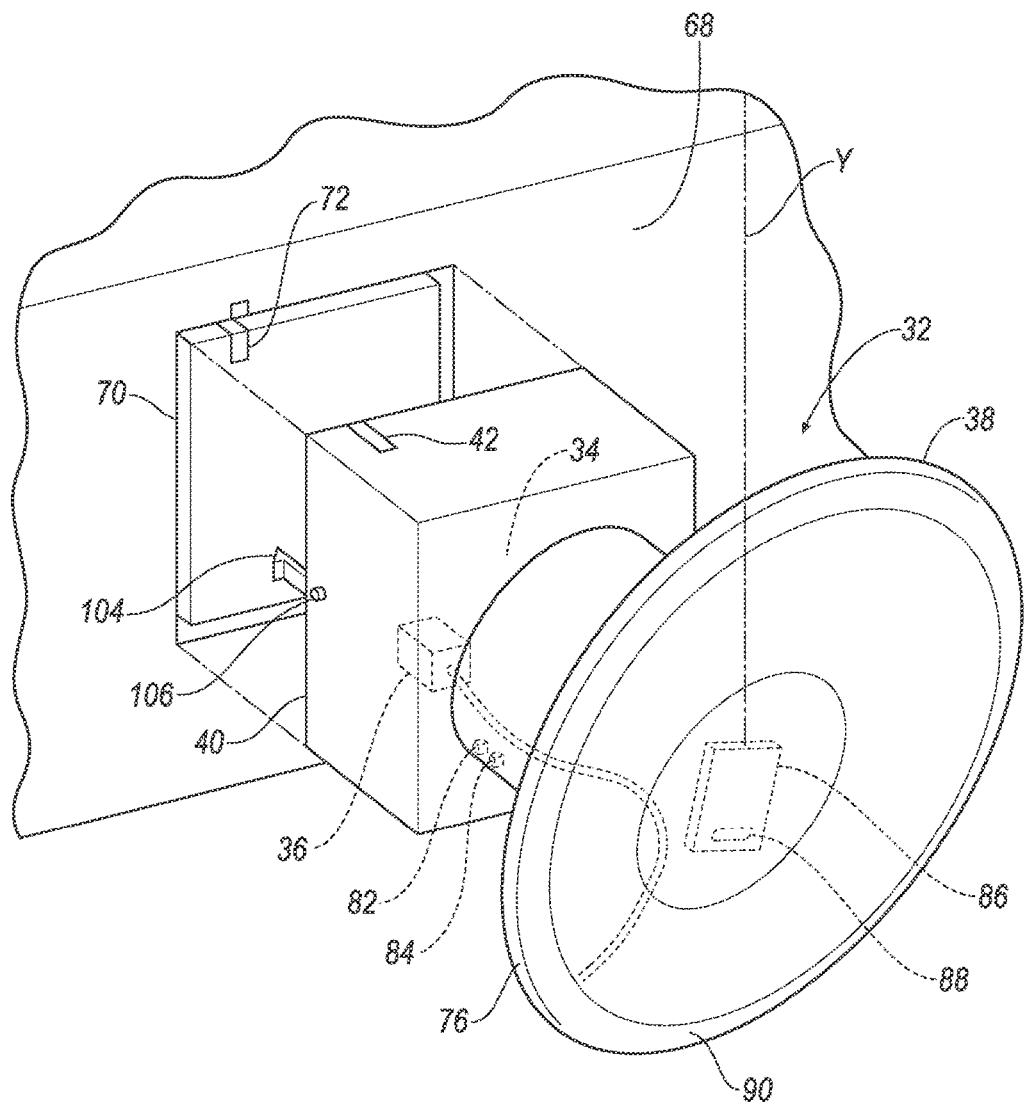
FIG. 3 is a perspective view of the dashboard and an example steering-wheel assembly with a light display.
Figure 4:
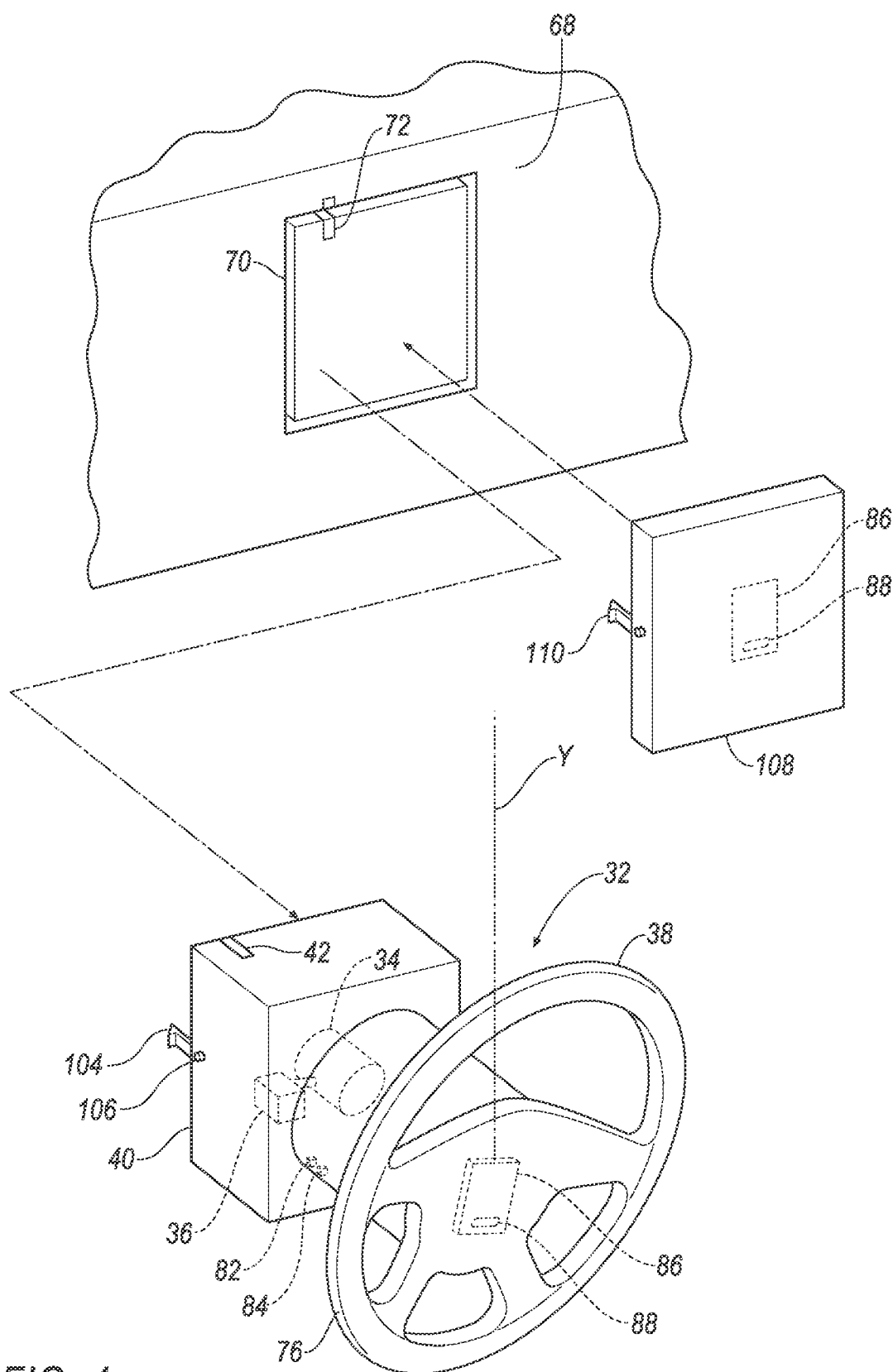
FIG. 4 is a perspective view of the dashboard and steering-wheel assembly of FIG. 1 and a cover.

With reference to FIGS. 2-4, a dashboard 68 of the vehicle 30 is typically disposed in the passenger cabin 52. The dashboard 68 may present a surface facing occupants of the vehicle 30, e.g., facing rearward from a front of the vehicle 30, as is known.

The dashboard 68 may include an attachment 70. The attachment 70 of the dashboard 68 may removably mate with an attachment 40 of the steering-wheel assembly 32. "Removably mateable" in the context of this disclosure means that the attachment 70 of the dashboard 68 may receive and hold, or be received and held by, the attachment 40 of the steering-wheel assembly 32, but the attachment 70 of the dashboard 68 may also permit removal of the mated steering-wheel assembly 32, e.g., permit an occupant to remove the steering-wheel assembly 32. The attachment 70 of the dashboard 68 may receive clips 104 or use any other suitable mechanism to mate with the attachment 40 of the steering-wheel assembly 32, as described with respect to the attachment 40 below.

The attachment 70 of the dashboard 68 may include a second data connector 72 mateable to the first data connector 42 on the steering-wheel assembly 32. (The adjectives "first" and "second" are used throughout this document as identifiers and are not intended to signify importance or order.) The second data connector 72 may be capable of sending and receiving a data signal. The second data connector 72 may be in communication with the vehicle controller 56, e.g., via the communication network 62. The second data connector 72 may be formed of any electrically conducting material, such as copper, aluminum, or other metals or conductive materials.

The steering-wheel assembly 32 may be removably mateable to the attachment 70 included in the vehicle dashboard 68. The steering-wheel assembly 32 may include a steering wheel 38, an attachment 40 of the steering-wheel assembly 32, the first data connector 42, and an indicator of a steering-wheel angle. The steering-wheel assembly 32 may, as a unit, be removed from the vehicle 30.

The steering wheel 38 may have a circular periphery 76. The steering wheel 38 may be graspable by an occupant of the vehicle 30. The steering wheel 38 may be rotatably coupled to the attachment 40 of the steering-wheel assembly 32, for example, via a bearing (not shown). The steering wheel 38 can rotate relative to the dashboard 68 when the steering-wheel assembly 32 is attached to the dashboard 68.

The attachment 40 may be rotatably coupled to the steering wheel 38. The attachment 40 of the steering-wheel assembly 32 may removably mate with the attachment 70 of the dashboard 68; that is, the attachment 40 of the steering-wheel assembly 32 receives and holds, or is received and held by, the attachment 70 of the dashboard 68, and the attachment 40 of the steering-wheel assembly 32 permits, e.g., an occupant to remove the steering-wheel assembly 32.

The attachment 40 of the steering-wheel assembly 32 may use flexible plastic clips 104 to mate with the attachment 70 of the dashboard 68. The clips 104 may catch on catching surfaces (not shown) in the attachment 70 when, e.g., an occupant inserts the attachment 40 of the steering-wheel assembly 32 into the attachment 70 of the dashboard 68. When the occupant wishes to remove the steering-wheel assembly 32, the occupant may push on clip buttons 106 to release the clips 104 from the catching surfaces. The attachment 40 may alternatively use any other suitable mechanism to removably mate with the attachment 70 of the dashboard 68 as is known in the art.

With reference to FIG. 4, a cover 108 may removably mate to the attachment 70 of the dashboard 68 if the steering-wheel assembly 32 is not mated to the dashboard 68. The cover 108 may protect the attachment 70 and/or the second data connector 72 from dirt, debris, or damage. The cover 108 may have clips 110 that mate with the attachment 70 in the same manner as the clips 104 of the steering-wheel assembly 32. If the steering-wheel assembly 32 includes a different mating mechanism than the clips 104, then the cover 108 may include a similar mating mechanism. Alternatively, the cover 108 may use a press-fit to mate.

With reference to FIGS. 2 and 3, the attachment 40 of the steering-wheel assembly 32 may include the first data connector 42 mateable to the second data connector 72 on the dashboard 68. The first data connector 42 may be capable of sending and receiving a data signal. The first data connector 42 may be mounted on the attachment 40 and in communication with the actuator controller 36 or a light-display controller 78. The first data connector 42 may be formed of any electrically conducting material, such as copper, aluminum, or other metals or conductive materials.

The first data connector 42 may be mateable to the second data connector 72 in the vehicle dashboard 68 to form a data connection 80 to the vehicle controller 56. The data connection 80 allows signals to be sent through the first data connector 42 to the vehicle controller 56 and vice versa.

The steering-wheel assembly 32 may include an angle-detection sensor 82 in communication with the first data connector 42 and thus in communication with the vehicle controller 56 via the data connection 80. The angle-detection sensor 82 may measure the angle by which the steering wheel 38 is rotated relative to the attachment 40 of the steering-wheel assembly 32. The angle-detection sensor 82 may be any sensor capable of measuring the orientation of the steering wheel 38, such as magnetic pick-up coils, Hall effect sensors, magneto-resistive element (MRE) sensors, or optical sensor.

The steering-wheel assembly 32 may include a torque-detection sensor 84 in communication with the first data connector 42 and thus in communication with the vehicle controller 56 via the data connection 80. The torque-detection sensor 84 may measure the torque applied to the steering wheel 38. The torque-detection sensor 84 may be any sensor capable of measuring torque such as are known.

The steering-wheel assembly 32 may include an airbag 86 coupled to the steering wheel 38, and the cover 108 may include an airbag 86 coupled to the cover 108. For example, the airbag 86 may be disposed in the middle of the steering wheel 38 and/or the cover 108. The airbag 86 may be formed of any suitable airbag material, for example, a woven polymer. For example, the airbag 86 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

An inflator 88 may be connected to the airbag 86. The inflator 88 may be in communication with the first data connector 42. Upon receiving a signal from, e.g., the vehicle controller 56, the inflator 88 may inflate the airbag 86 with an inflatable medium, such as a gas. The inflator 88 may be, for example, a pyrotechnic inflator that uses a chemical reaction to drive inflation medium to the airbag 86. The inflator 88 may be of any suitable type, for example, a cold-gas inflator.

The steering-wheel assembly 32 may include programming in the actuator controller 36 or the light-display controller 78 to indicate a steering-wheel angle, that is, the angular orientation of the steering wheel 38 relative to a vertical axis Y. For example, a steering-wheel angle may be indicated by the actuator 34 moving the steering wheel 38, to which it may be rotatably coupled, as shown in FIG. 2, and/or a light display 90 mounted on the steering wheel 38, as shown in FIG. 3. The steering-wheel angle may be an actual angle of the steering wheel in the case of the actuator 34 or a virtual angle of the steering wheel in the case of the light display 90. The steering-wheel angle may be positive or negative, which are defined respectively as rotation to the right or rotation to the left.

With reference to FIGS. 2 and 5, indication of a steering-wheel angle may be carried out by the actuator 34 in communication with the first data connector 42. The attachment 40 may be coupled to the actuator 34. The steering wheel 38 may be rotatably coupled to the actuator 34. The actuator 34 may rotate the steering wheel 38 according to one or more instructions by the controller 36. The actuator 34 may be, for example, an electric motor, including any suitable type for actuating rotational motion, such as brushed DC motors, brushless DC motors, switched reluctance motors, stepper motors, etc.

The actuator controller 36 may be a microprocessor-based controller such as is known. The actuator controller 36 comprises a processor 44 and a memory 46. The memory 46 of the actuator controller 36 may store instructions executable by the processor 44.

With reference to FIGS. 3 and 6, indication of a steering-wheel angle may be carried out by selective activation of the light display 90 mounted on the steering wheel 38. For example, the light display 90 may be disposed on the circular periphery 76 of the steering wheel 38. The light display 90 may be in communication with the first data connector 42, which allows the light display 90 to communicate with the vehicle controller 56. The light display 90 may be any device that can selectively illuminate portions of the light display 90. For example, with reference to FIGS. 10A and 10B, the light display 90 may be a set of lights 92 arranged in a circle, each of which can be independently illuminated. Although not shown in the drawings, it should be understood that a circular arrangement of lights 92 may have one or more rows of lights 92.

The individual lights 92 may be illuminated in one or more groups of one, two, or more colors. For example, the state of each light may be illuminated yellow, illuminated red, or not illuminated (i.e., off). The lights 92 may be any suitable type, for example, light emitting diodes (LED).

The light-display controller 78 may be a microprocessor-based controller. The light-display controller 78 comprises a processor 94 and a memory 96. The memory 96 of the light-display controller 78 may store instructions executable by the processor 94.

Figure 9:
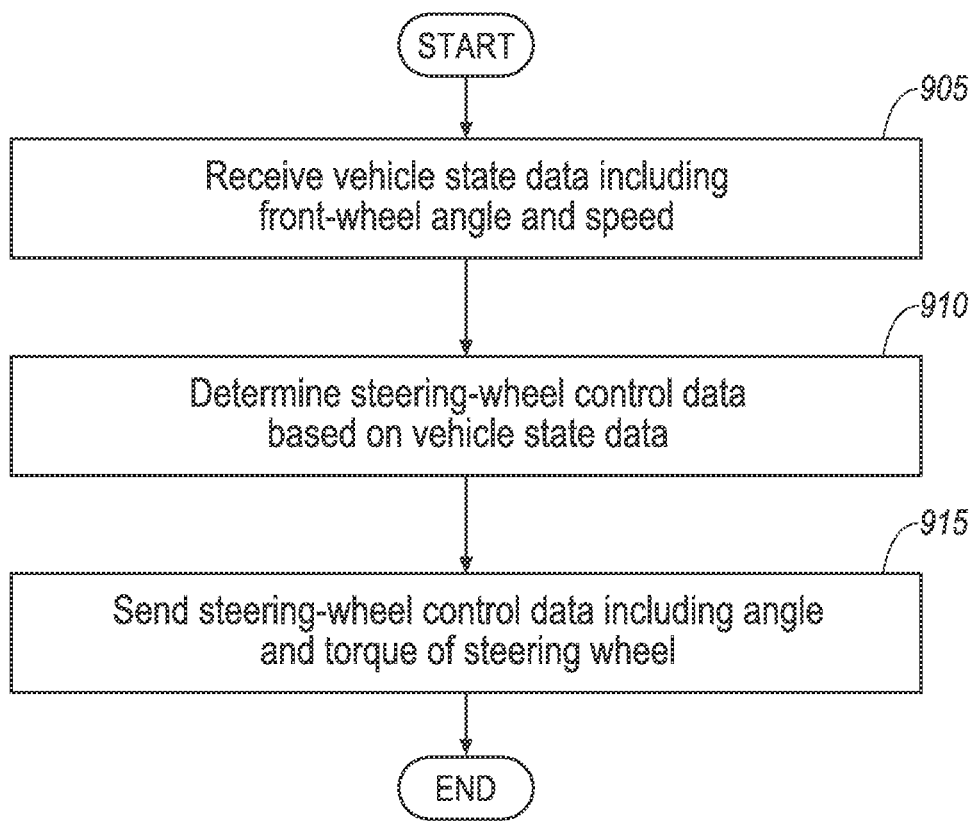
FIG. 9 is a process flow diagram of an example process executed by a vehicle controller.

FIG. 9 is a process flow diagram of a process 900 that may be executed by the vehicle controller 56. First, in a block 905, the vehicle controller receives vehicle state data. The vehicle state data includes wheel-angle data gathered via the wheel-angle detector 58, and the vehicle state data includes speed data gathered via the speedometer 60. Thus, the vehicle controller 56 is programmed to receive a vehicle speed from the speedometer 60 and a front-wheel angle from the wheel-angle detector 58.

Next, in a block 910, the vehicle controller 56 determines the steering-wheel control data based on the vehicle state data. The steering-wheel control data may include at least one of an angle of the steering wheel 38 and a torque of the steering wheel 38. For example, the steering-wheel angle may be a function of the front-wheel angle, e.g., a linear function of the front-wheel angle such as $y=f(x)=Kx$, in which y is the steering-wheel angle, x is the front-wheel angle, and K is a constant steering ratio. Thus, for example, if the steering ratio is 20, a front-wheel angle of 5° gives a steering-wheel angle of 100°, and a front-wheel angle of 30° gives a steering-wheel angle of 600°. Alternatively, the steering-wheel angle may be a nonlinear function of the front-wheel angle. For example, an active front steering system may change the steering ratio as a function of the speed of the vehicle 30, so a smaller steering-wheel angle at a lower speed produces the same front-wheel angle as a larger steering-wheel angle at a higher speed. As an alternative or in addition to active front steering, compliance in tires, a suspension system, and/or the steering system may factor into the relationship between the steering-wheel angle and the front-wheel angle.

Finally, in a block 915, the vehicle controller 56 sends the steering-wheel control data, including the steering-wheel angle and the torque data, to either the actuator controller 36 or the light-display controller 78. The process 900 ends following the block 915.

Figure 7:
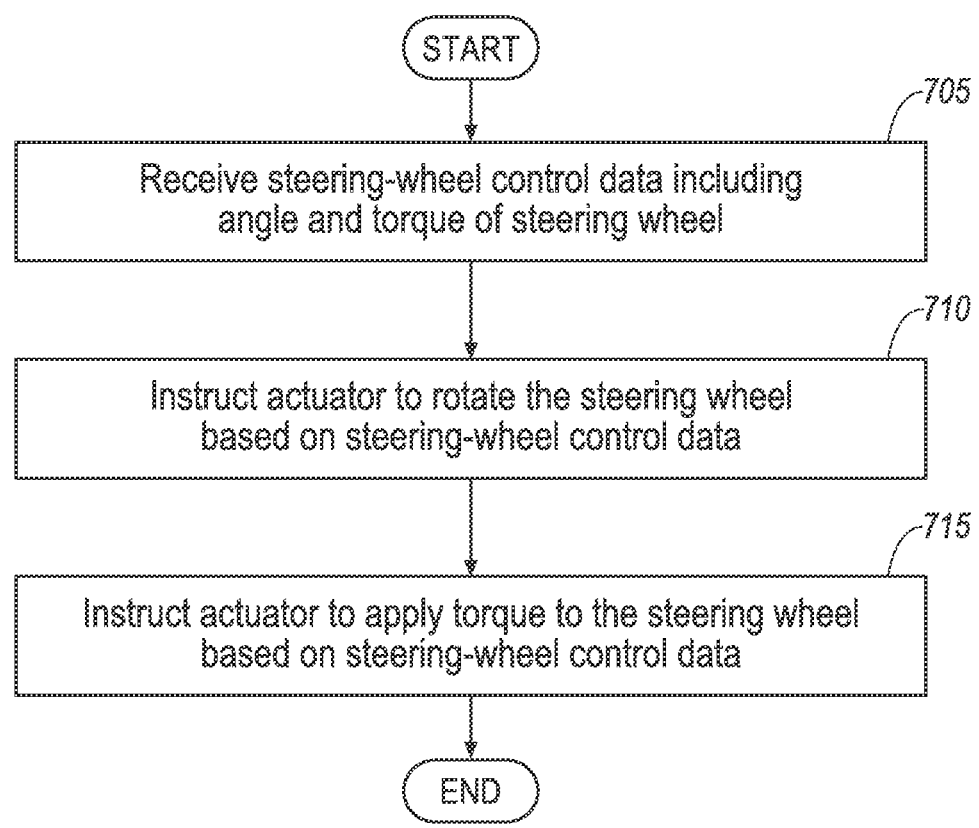
FIG. 7 is a process flow diagram of an example process executed by a controller for the steering-wheel assembly of FIG. 1.

FIG. 7 is a process flow diagram of a process 700 that may be executed by the actuator controller. The actuator controller 36 may be programmed to instruct the actuator 34 to rotate the steering wheel 38 based on steering-wheel control data provided via the first data connector 42. First, in a block 705, the actuator controller 36 receives the steering-wheel control data, transmitted from the vehicle controller 56 through the data connection 80. The steering-wheel control data may include a steering-wheel angle and a torque.

Next, in a block 710, the actuator controller 36 instructs the actuator 34 to rotate the steering wheel 38 based on the steering-wheel control data, e.g., rotate the steering wheel 38 by 100° if the steering-wheel control data includes a steering-wheel angle of 100° or by 600° if the steering-wheel control data includes a steering-wheel angle of 600°.

Finally, in a block 715, the actuator controller 36 instructs the actuator 34 to provide a torque to the steering wheel 38 based on torque data provided via the first data connector 42. The process 700 ends following the block 715.

Figure 8:
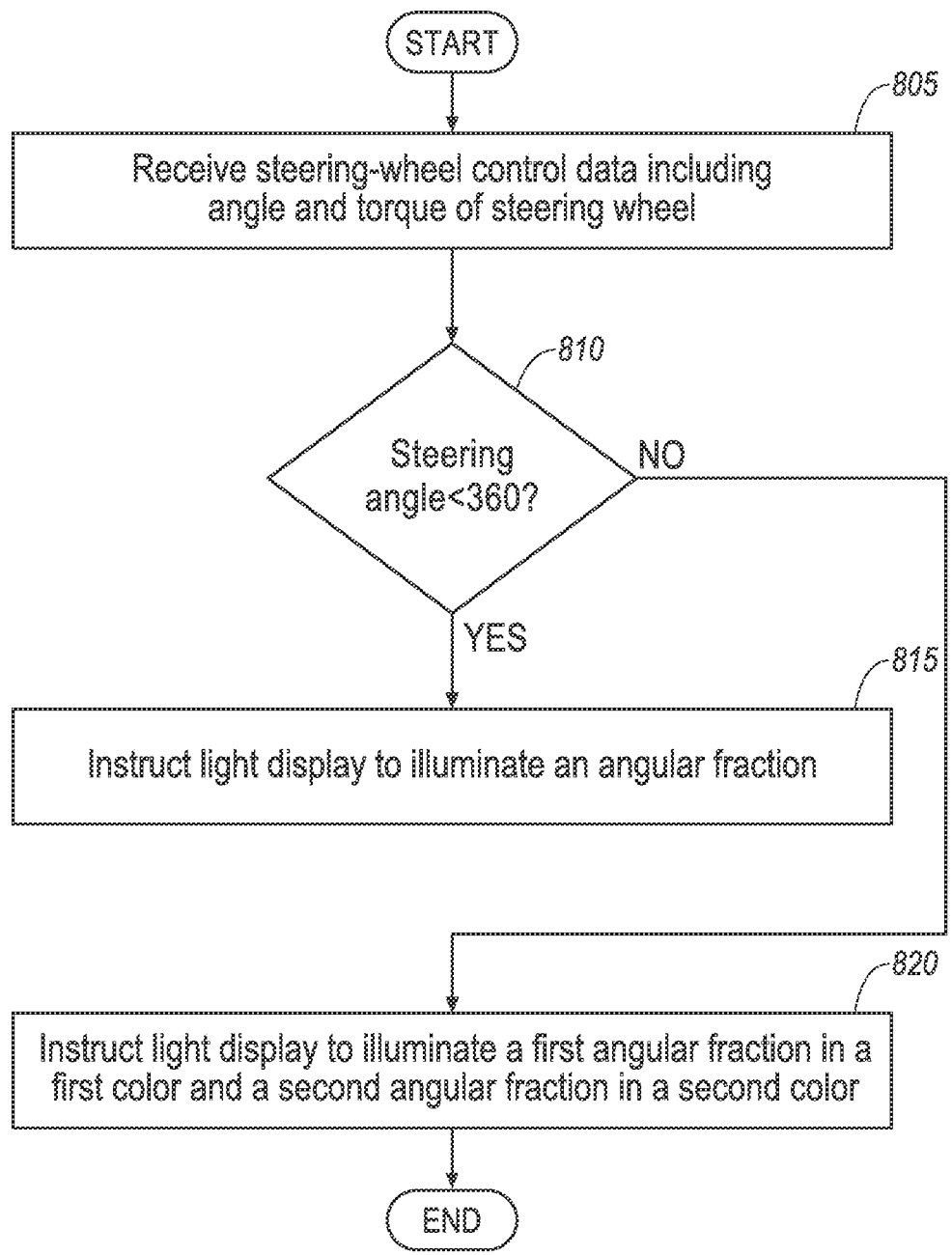
FIG. 8 is a process flow diagram of an example process executed by a controller for the steering-wheel assembly of FIG. 3.

FIG. 8 is a process flow diagram of a process 800 that may be executed by the light-display controller 78. The light-display controller 78 may be programmed to instruct the light display 90 to illuminate in a pattern based on steering-wheel control data provided via the first data connector 42. First, in a block 805, the light-display controller 78 receives the steering-wheel control data, transmitted from the vehicle controller 56 through the data connection 80. The steering-wheel control data may include a steering-wheel angle.

Next, in a decision block 810, the light-display controller 78 determines whether the steering-wheel angle is greater or lesser than 360°. If the steering-wheel angle is negative, then the light-display controller 78 may use the absolute value of the steering-wheel angle. Alternatively, the light-display controller 78 may determine whether the steering-wheel angle is between −360° and 360°.

Figures 10A, 10B:
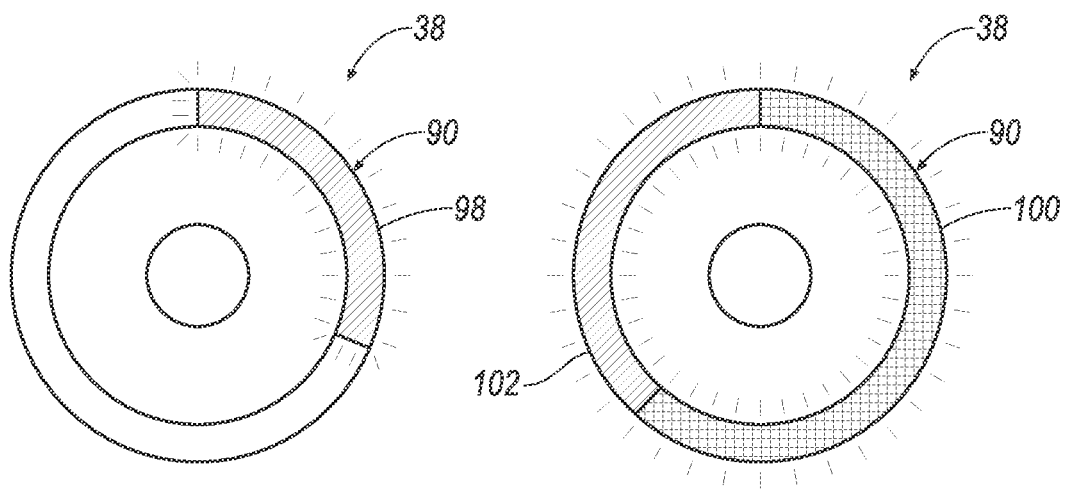
FIG. 10A is an exemplary front view of the steering-wheel assembly of FIG. 3.
FIG. 10B is another exemplary front view of the steering-wheel assembly of FIG. 3.

If the steering-wheel angle is less than or equal to 360°, in a block 815, then the light-display controller 78 instructs the light display 90 to illuminate an angular fraction 98 of the light display 90 based on the steering-wheel control data provided via the first data connector 42. For example, if the steering-wheel control data includes a steering-wheel angle of 100°, the vehicle controller 56, based on its programming, instructs the light display 90 to illuminate lights 92 corresponding to 100° of the circular periphery 76 of the steering wheel 38, as shown in FIG. 10A.

If the steering-wheel angle is greater than 360°, in a block 820, then the light-display controller 78 instructs the light display 90 to illuminate the first angular fraction 100 of the light display 90 in a first color and the second angular fraction 102 of the light display 90 in a second color, based on the steering-wheel control data provided via the first data connector 42. For example, if the steering-wheel control data includes a steering-wheel angle of 600°, the vehicle controller 56, based on its programming, instructs the light display 90 to illuminate lights 92 corresponding to 240° of the circular periphery 76 of the steering wheel 38 in yellow and to illuminate lights 92 corresponding to the remaining 120° of the circular periphery 76 of the steering wheel 38 in red, thus representing a steering-wheel angle of 600° (360°+240°), as shown in FIG. 10B. For another example, if the steering-wheel control data includes a steering-wheel angle of 600°, the vehicle controller 56, based on its programming, instructs the light display 90 to illuminate 360° of one row of lights 92 and 240° of a second row of lights 92 (not shown). The first color of the first row of lights 92 may be the same or different than the second color of the second row of lights 92. Following the block 820, the process 800 ends.

Effectively, the vehicle controller 56 is programmed to instruct, via the data connection 80, actuation of the actuator 34 and/or lights 92 based on the vehicle state data.

The vehicle controller 56 may be programmed to instruct the actuator 34 to rotate the steering wheel 38 based on the vehicle state data, as described above with respect to FIGS. 9 and 7. For example, if the vehicle state data includes a front-wheel angle of 5°, the vehicle controller 56 may, based on its programming, instruct the actuator 34 to rotate the steering wheel 38 by 100°. The vehicle controller 56 may be programmed to instruct the actuator 34 to apply a torque to the steering wheel 38 based on steering-wheel parameters determined from the vehicle state data as described above.

Alternatively, the vehicle controller 56 may be programmed to instruct the light display 90 to illuminate in a pattern based on the vehicle state data, as described above with respect to FIGS. 9 and 8. Specifically, the vehicle controller 56 may be programmed to instruct the light display 90 to illuminate an angular fraction 98 of the light display 90 based on the vehicle state data. For example, if the vehicle state data includes a front-wheel angle of 5°, the vehicle controller 56 may, based on its programming, instruct the light display 90 to shine lights 92 corresponding to 100° of the circular periphery 76 of the steering wheel 38, as shown in FIG. 10A. Moreover, the vehicle controller 56 may be programmed to instruct the light display 90 to illuminate a first angular fraction 100 of the light display 90 in a first color and a second angular fraction 102 of the light display 90 in a second color, based on the vehicle state data. For example, if the vehicle state data includes a front-wheel angle of 30°, the vehicle controller 56 may, based on its programming, instruct the light display 90 to shine lights 92 corresponding to 240° of the circular periphery 76 of the steering wheel 38 in yellow and to shine lights 92 corresponding to the remaining 120° of the circular periphery 76 of the steering wheel 38 in red, thus representing a steering-wheel angle of 600° (360°+240°), as shown in FIG. 10B.

In operation, indicating a steering-wheel angle eases the transition from autonomous mode to manual mode for a human driver of the vehicle 30. In autonomous mode, the steering-wheel assembly 32 indicates the front-wheel angle to the human driver. The actuator 34 may rotate the steering wheel 38 based on the front-wheel angle, in which case the human driver understands the front-wheel angle. The light display 90 may indicate the same information by illuminating the steering wheel 38 with the angular fraction 98 or angular fractions 100, 102. If the human driver decides to initiate a handover from autonomous mode to manual mode, then the human driver has sufficient information to take over the steering wheel 38 regardless of the front-wheel angle.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A steering-wheel assembly comprising:
    a steering wheel;
    a light display mounted on the steering wheel;
    a light-display controller, comprising a processor and a memory, communicatively coupled to the light display;
    an attachment rotatably coupled to the steering wheel; and
    a data connector mounted on the attachment and in communication with the light-display controller; wherein
    the light-display controller is programmed to instruct the light display to illuminate in a pattern based on steering-wheel control data provided via the data connector;
    the steering wheel has a circular periphery;
    the light display is disposed on the circular periphery of the steering wheel; and
    the light-display controller is programmed to instruct the light display to illuminate an angular fraction of the light display based on steering-wheel control data provided via the data connector.

2. The steering-wheel assembly of claim 1, wherein the light-display controller is programmed to instruct the light display to illuminate a first angular fraction of the light display in a first color and a second angular fraction of the light display in a second color, based on the steering-wheel control data provided via the data connector.

3. The steering-wheel assembly of claim 1, further comprising an angle-detection sensor in communication with the data connector, and a torque-detection sensor in communication with the data connector.

4. The steering-wheel assembly of claim 1, further comprising an airbag coupled to the steering wheel; and an inflator connected to the airbag, the inflator in communication with the data connector.

5. The steering-wheel assembly of claim 1, wherein the steering-wheel control data includes at least one of an angle of the steering wheel and a torque of the steering wheel.

6. A vehicle comprising:
    a vehicle controller, comprising a processor and a memory; and
    a steering-wheel assembly removably mateable to an attachment included in a vehicle dashboard, the steering-wheel assembly comprising
    a steering wheel,
    a first data connector mateable to a second data connector in the vehicle dashboard to form a data connection to the vehicle controller, and
    an actuator in communication with the first data connector; wherein
    the vehicle controller is programmed to receive vehicle state data;
    the vehicle controller is programmed to instruct, via the data connection, actuation of the actuator based on the vehicle state data; and
    the steering wheel is rotatably coupled to the actuator.

7. The vehicle of claim 6, wherein the vehicle controller is programmed to instruct the actuator to rotate the steering wheel based on the vehicle state data.

8. The vehicle of claim 6, further comprising:
a front wheel; and
a wheel-angle detector coupled to the front wheel and in communication with the vehicle controller; wherein
the vehicle state data includes wheel-angle data gathered via the wheel-angle detector; and
the steering-wheel angle is a function of the front-wheel angle.

9. The vehicle of claim 8, further comprising:
a speedometer in communication with the vehicle controller; wherein
the vehicle state data includes speed data gathered via the speedometer;
the vehicle controller is programmed to receive a vehicle speed from the speedometer; and
the vehicle controller is programmed to instruct the actuator to apply a torque to the steering wheel based on the vehicle state data.

10. The vehicle of claim 6, wherein the steering-wheel assembly further comprises:
an angle-detection sensor in communication with the vehicle controller via the data connection; and
a torque-detection sensor in communication with the vehicle controller via the data connection.

11. The vehicle of claim 6, wherein the steering-wheel assembly further includes:
an airbag coupled to the steering wheel; and
an inflator connected to the airbag, the inflator in communication with the vehicle controller via the data connection.

12. The vehicle of claim 6, wherein the vehicle controller is programmed to instruct the actuator to provide a torque to the steering wheel based on torque data provided via the data connector.

13. The vehicle of claim 6, wherein the vehicle state data includes at least one of an angle of the steering wheel and a torque of the steering wheel.

14. A vehicle comprising:
a vehicle controller, comprising a processor and a memory; and
a steering-wheel assembly removably mateable to an attachment included in a vehicle dashboard, the steering-wheel assembly comprising
a steering wheel,
a first data connector mateable to a second data connector in the vehicle dashboard to form a data connection to the vehicle controller, and
a light display mounted on the steering wheel; wherein
the vehicle controller is programmed to receive vehicle state data;
the vehicle controller is programmed to instruct, via the data connection, actuation of the means for indicating a steering-wheel angle based on the vehicle state data;
the light display is in communication with the first data connector; and
the vehicle controller is programmed to instruct the light display to illuminate in a pattern based on the vehicle state data.

15. The vehicle of claim 14, wherein:
the steering wheel has a circular periphery;
the light display is disposed on the circular periphery of the steering wheel; and
the vehicle controller is programmed to instruct the light display to illuminate an angular fraction of the light display based on the vehicle state data.

16. The vehicle of claim 15, wherein the vehicle controller is programmed to instruct the light display to illuminate a first angular fraction of the light display in a first color and a second angular fraction of the light display in a second color, based on the vehicle state data.

17. The vehicle of claim 14, wherein the vehicle controller has an autonomous mode and a manual mode, and the steering wheel is fixed relative to the attachment when the vehicle controller is in autonomous mode.

18. The vehicle of claim 14, further comprising:
a front wheel; and
a wheel-angle detector coupled to the front wheel and in communication with the vehicle controller; wherein
the vehicle state data includes wheel-angle data gathered via the wheel-angle detector; and
the steering-wheel angle is a function of the front-wheel angle.

19. The vehicle of claim 18, further comprising a speedometer in communication with the vehicle controller; wherein the vehicle state data includes speed data gathered via the speedometer; the vehicle controller is programmed to receive a vehicle speed from the speedometer; and the vehicle controller is programmed to instruct the actuator to apply a torque to the steering wheel based on the vehicle state data.

20. The vehicle of claim 14, further comprising an airbag coupled to the steering wheel; and an inflator connected to the airbag, the inflator in communication with the data connector.

21. The vehicle of claim 14, wherein the vehicle state data includes at least one of an angle of the steering wheel and a torque of the steering wheel.

22. The vehicle of claim 14, wherein the steering-wheel assembly further comprises an angle-detection sensor in communication with the vehicle controller via the data connection; and a torque-detection sensor in communication with the vehicle controller via the data connection.

* * * * *